Nov. 13, 1956  J. J. ROBERTS  2,770,462
LOOSE JAW CHUCK
Filed June 1, 1954  2 Sheets-Sheet 1
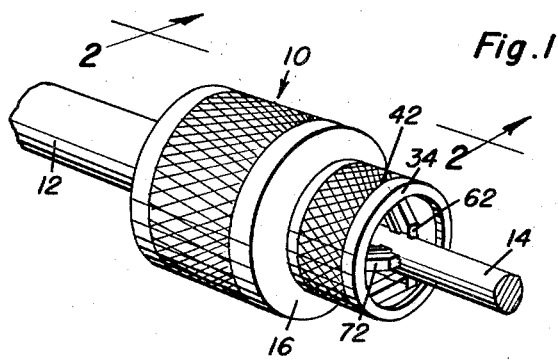
Fig.1
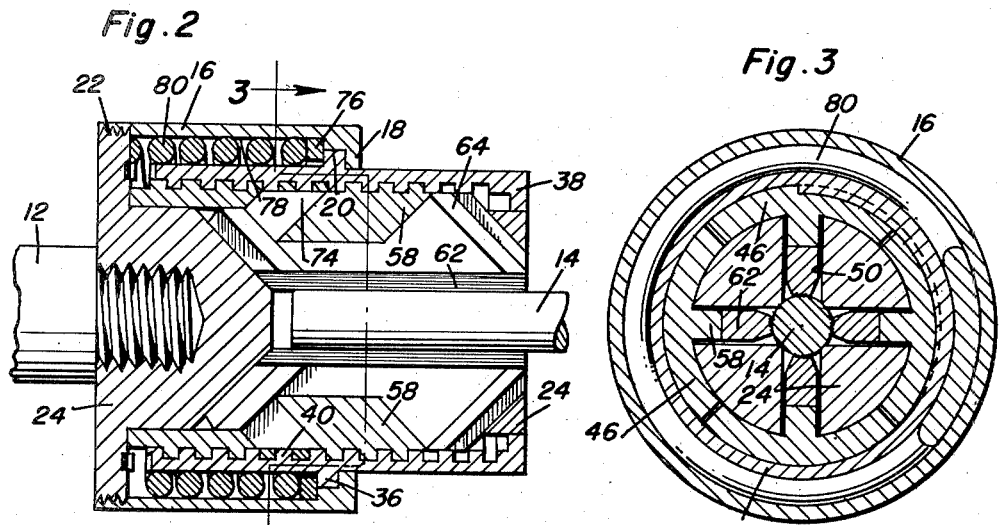
Fig.2
Fig.3
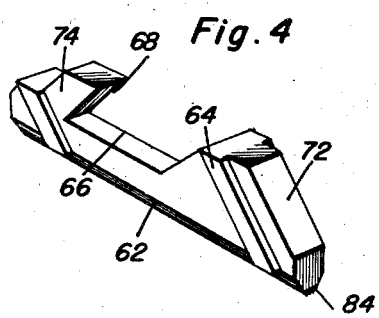
Fig.4
John Jerdon Roberts
INVENTOR.
BY *Clarence A. O'Brien*
and *Harvey B. Jackson*
Attorneys Nov. 13, 1956  J. J. ROBERTS  2,770,462
LOOSE JAW CHUCK Filed June 1, 1954  2 Sheets-Sheet 2

John Jerdon Roberts
INVENTOR.

BY

United States Patent Office 2,770,462
Patented Nov. 13, 1956

2,770,462

LOOSE JAW CHUCK

John Jerdon Roberts, Riverside, Idaho

Application June 1, 1954, Serial No. 433,422

5 Claims. (Cl. 279—56)

This invention relates to a chuck and more specifically provides a device for attachment to a lathe, drill or a similar type machine having a rotating output shaft wherein the chuck of the present invention may be utilized to securely clamp a tool, drill bit or other tool or work for rotation thereof.

An object of this invention is to provide a chuck having an improved and novel structure including a plurality of radially movable gripping jaws and complementary cam surfaces for moving the jaws into gripping and ungripping position.

Another object of this invention is to provide a chuck which is simple and quick in operation, positive in actuation, easy to assemble and disassemble, provided with a locking feature, provided with an automatic tightening feature, well adapted for its intended purposes and relatively inexpensive to manufacture and maintain.

A still further object of this invention is to provide a chuck wherein the jaws are continuously and automatically urged inwardly into gripping relation with a tool or the like.

A still further object of this invention is to provide a chuck having means for locking the gripping jaws in position.

Yet another relatively important object of this invention is to provide a chuck having a plurality of gripping jaws or dogs having a plurality of wedge surfaces thereon for engagement with a longitudinally moving pressure member for urging the jaws or dogs into gripping or ungripping relation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the chuck of the present invention attached to a machine spindle and having a tool secured within the gripping jaws;

Figure 2 is a longitudinal, vertical sectional view taken substantially along the plane passing through section line 2—2 of Figure 1, showing the details of construction of the assembled chuck of the present invention;

Figure 3 is a transverse, vertical sectional view taken substantially along the plane passing through section line 3—3 of Figure 2 showing the structural details of the inner cylindrical member and the radially movable dogs mounted in slots therein;

Figure 4 is a perspective view showing the details of construction of one of the plurality of radially movable gripping dogs or jaws;

Figure 5 is an exploded group longitudinal, vertical sectional view showing the relationship and the assembly of the inner cylinder, the segmental pressure ring, the intermediate cylinder threadedly engageable with the pressure ring, and the abutment washer for engagement by the compression coil spring;

Figure 6 is a top plan sectional view taken substantially along section line 6—6 of Figure 5, showing the details of construction of the inner cylinder and specifically the coil spring stop; and Figure 7 is a perspective view showing the details of construction of one of the segments of the segmental pressure ring.

Referring now specifically to the drawings, it will be seen that the numeral 10 generally designates the chuck of the present invention for positioning on the output power spindle 12 of a suitable machine, such as a lathe, drill or the like. The chuck 10 is utilized for holding the shank 14 of a rotating tool, such as a drill bit, reamer or other similar tool. The chuck 10 includes an outer cylindrical casing 16 having its outer periphery knurled and including an inwardly extending peripheral flange at one end thereof with the peripheral flange 18 having an annular recess 20 forming a step flange for purposes described hereinafter. The other end of the cylindrical outer casing 16 is internally threaded, as indicated by the numeral 22, for a purpose described hereinafter.

Referring now specifically to Figure 5, it will be seen that an inner cylinder 24 is provided with an internally threaded socket 26 for receiving a threaded portion 28 of the spindle 12 for attaching the chuck 10 to the spindle 12. The inner cylinder 24 is provided with an external end flange 30 that is externally threaded, as indicated by the numeral 32, for threaded engagement with the internally threaded portion 22 of the outer casing 16 wherein the inner cylinder 24 and the outer casing 16 are retained in assembled relation.

An intermediate cylinder 34 having a centrally disposed external annular flange 36 is disposed within the outer casing 16 with the external flange 36 rotatably received within the annular recess 20 on the inner side of the inwardly extending flange 18 on the outer casing 16, thereby retaining the intermediate cylinder 34 in assembled relation and held captive by the outer casing 16. The intermediate cylinder 34 is provided with an internally extending annular flange 38 at one end thereof which is normally positioned exteriorly of the outer casing 16 and the entire inner surface of the intermediate cylinder 34 is internally threaded, as indicated by the numeral 40 with threads that are relatively large for a purpose described hereinafter. The outer surface of the intermediate member 34 is knurled, as indicated by the numeral 42, between the central flange 36 and the end flange 38 which is disposed exteriorly of the outer casing 16 for gripping the intermediate cylinder 34 and rotating the same.

A segmental pressure ring 44 is constructed of four segments which form a cylindrical pressure ring and each of the segments 46 extends 90° and is provided with external threads 48 on the outer surface thereof for engagement with the internal threads 40 on the intermediate cylinder 34. The inner circumference of the segmental members 46 is commensurate in size with the external surface of the inner cylinder 24 and the segmental pressure member 44 is slidably received thereon. As shown in Figure 5, the inner cylinder 24 is provided with four circumferentially spaced slots 50 that extend radially completely through the inner cylinder 24 into the circular interior 52 which receives the tool shank 14. The end walls of the slot 50 are slanted downwardly and towards the open end of the cylindrical member 52, as indicated by the numeral 54. Each of the side walls of each slot 50 is provided with a downwardly and forwardly sloped groove 56 that is parallel to the end edges 54 of the slot 50. Each of the segmental members 46 forming the pressure ring 44 is provided with an inwardly extending radial projection 58 forming a cam member having inwardly and rearwardly sloping end edges 60 which project into each slot 50 in spaced relation to each end wall 54 thereof.

A plurality of dogs or jaws 62 are provided with each dog or jaw 62 having a pair of longitudinally spaced sloping ribs 64 for sliding engagement in the pair of grooves 56 in each side wall of each radial slot 50. The central portion of each of the dogs 62 is provided with a recessed portion 66 having sloped end walls 68 which receive and engage the sloping end walls 60 of the projection 58 on each of the segmental members 46 forming the pressure ring 44. The forward and rear ends of each of the dogs 62 is provided with a sloped end wall 70 for engaging the sloped end wall 54 of each of the slots 50.

Referring now specifically to Figure 7, it will be seen that each of the segmental members 46 is provided with an opening 73 having sloping side walls and each of the dogs 62 is provided with a projection 74 having end walls receivable in the apertures 73 and projecting outwardly into sliding contacting engagement with the inner surface of the screw threads 40 on the intermediate member 34.

Referring now specifically to Figures 2 and 6, it will be seen that an abutment ring 76 is positioned in the space 78 between the outer casing 16 and the intermediate cylinder 34 for engaging one end of a compression coil spring 80 which is compressed between the abutment washer 76 on one end and on the external flange 30 on the other end, wherein the external flange 30 is provided with a plurality of circumferentially spaced spring stop members 82 for engaging and locking the compression spring 80 in angular position. It will be seen that the pressure washer or abutment washer 76 engages both the inturned flange 18 on the outer casing 16 and the external flange 36 on the intermediate member 34, thereby retaining the members 16 and 34 in stationary longitudinal relation by the compressive action of spring 80. Suitable longitudinal serrations 84 may be provided on the inner surfaces of each of the gripping dogs or jaws 62, thereby securely gripping the shank 14 of the tool, thereby preventing relative rotation between the gripping jaws and the tool shank.

The device is assembled by positioning the dogs 62 in the slot 50 with the segmental members 46 surrounding the device with the projections 58 received in the recesses 56 in the dog 62 and the intermediate member with the spring disposed therearound is threaded onto the external threads 48 on the segmental members 46. Obviously, the seal washer 76 is disposed between the spring 80 and the external flange 36 on the intermediate member 34 and the outer casing 16 is then screw threaded onto the external flange 30 of the inner cylinder 24 with the internal flange 16 and recess 20 engaging the external flange 36 substantially as illustrated in Figure 2.

After a tool shank 14 has been inserted into the cylindrical portion 52 of the inner casing 24, the intermediate member 34 is rotated in a clockwise direction by gripping the knurled portion 42 which extends exteriorly of the outer casing 16. Upon rotation of the exterior portion of the intermediate member 34, the inwardly projecting lugs 58 having the cam surface end 60 move outwardly towards the internal flange 38 on the intermediate member 34, thereby engaging the cam surfaces 68 of the recessed portion 56 of the dogs 62. This tends to urge the dogs 62 inwardly and towards the internal flange 38 and the cam surfaces 72 on the dog ends and the slanting relationship of the ribs 64 positioned in the slanting grooves 56 also cause the dogs 62 to move radially inwardly in gripping relation to the tool shank 14. This securely grips the tool shank 14 and the compression coil spring 80 retains the external flange 36 of the intermediate member 34 against the internal flange 18 on the outer casing 16. When the gripping jaws or dogs 62 securely grip the tool shank 14, the spring 80 may be tensioned by turning the intermediate member, together with the spring 80, about one-quarter of a turn, thereby engaging the end of the spring 80 with the spring stop 82 thereby securely tensioning the spring 80 wherein the spring 80 urges the flange 36 towards the flange 18 thereby continuously urging the jaws 62 inwardly into tighter gripping relation with the tool shank 14, thereby automatically tightening and locking the jaws in clamping or gripping position. The device will be easily unlocked by rotating the intermediate member 34 in a counter clockwise direction, thereby releasing the spring 80 from the spring stops 82 and then withdrawing the jaws 62 due to the slanting relation of the ribs 64, the end portion 72, and the end portion of the projecting lug 58 positioned in the end portion 68 of the recess 66 on the jaw 62, thereby withdrawing the jaws 62 from the internal flange 38 and moving them radially outwardly from ungripping or releasing the tool shank 14 in an obvious manner. It will be understood that suitable tool steel or the like may be utilized in the construction of the present invention wherein the chuck of the present invention will permit persons to easily and quickly as well as positively clamp the tool on a lathe, drill or the like having a rotatable power output spindle. Obviously, the device may be utilized for holding the tool or the work, and may be made in various sizes to accommodate work in wide ranges of size.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A chuck comprising an outer casing, an inner cylinder, an intermediate cylinder rotatably positioned between the outer casing and the inner cylinder, a segmental pressure ring positioned around the inner cylinder, said inner cylinder having a plurality of slots with inclined end walls forming cam surfaces, a plurality of tool gripping jaws radially movably mounted in said slots, said jaws having inclined outer ends with cam surfaces for engaging the cam surfaces in the end walls of said slots in said segmental pressure ring, said pressure ring being exteriorly threaded and said intermediate cylinder being interiorly threaded wherein said cam surfaces will move relative to each other upon rotation of the intermediate cylinder thereby moving said jaws radially in the slots for selectively gripping a tool.

2. A chuck comprising an outer casing, an inner cylinder, an intermediate cylinder rotatably positioned between the outer casing and the inner cylinder, a segmental pressure ring positioned around the inner cylinder, said inner cylinder having a plurality of slots with inclined end walls forming cam surfaces, a plurality of tool gripping jaws radially movably mounted in said slots, said jaws having inclined outer ends with cam surfaces for engaging the cam surfaces in the end walls of said slots in said segmental pressure ring, said pressure ring being exteriorly threaded and said intermediate cylinder being interiorly threaded wherein said cam surfaces will move relative to each other upon rotation of the intermediate cylinder thereby moving said jaws radially in the slots for selectively gripping a tool said outer casing being provided with an inwardly extending peripheral flange at one end for closely surrounding the intermediate cylinder, said intermediate cylinder having a centrally located peripheral external flange engaging behind the internal flange on the outer casing, an externally threaded flange on the inner cylinder engaging an internally threaded portion on the outer casing remote from said flanges, and a compression coil spring disposed between the threaded flange on the inner cylinder and the external flange on the intermediate cylinder thereby holding the intermediate cylinder resiliently stationary in relation to the outer casing and inner cylinder.

3. A chuck comprising an outer casing, an inner cylinder, an intermediate cylinder rotatably positioned between the outer casing and the inner cylinder, a segmental pressure ring positioned around the inner cylinder, said inner cylinder having a plurality of slots with inclined end walls forming cam surfaces, plurality of tool gripping jaws radially movably mounted in said slots, said jaws having inclined outer ends with cam surfaces for engaging the cam surfaces in the end walls of said slots in said segmental pressure ring, said pressure ring being exteriorly threaded and said intermediate cylinder being interiorly threaded wherein said cam surfaces will move relative to each other upon rotation of the intermediate cylinder thereby moving said jaws radially in the slots for selectively gripping a tool, said outer casing being provided with an inwardly extending peripheral flange at one end for closely surrounding the intermediate cylinder, said intermediate cylinder having a centrally located peripheral external flange engaging behind the internal flange on the outer casing, an externally threaded flange on the inner cylinder engaging an internally threaded portion on the outer casing remote from said flanges, and a compression coil spring disposed between the threaded flange on the inner cylinder and the external flange on the intermediate cylinder thereby holding the intermediate cylinder resiliently stationary in relation to the outer casing and inner cylinder, said jaws being provided with longitudinal serrations, and said slot walls and jaws having complementary slanted grooves and ribs for guiding and causing radial movement of the jaws.

4. A chuck comprising an outer casing, an inner cylinder, an intermediate cylinder rotatably positioned between the outer casing and the inner cylinder, a segmental pressure ring positioned around the inner cylinder, said inner cylinder having a plurality of slots with inclined end walls forming cam surfaces, plurality of tool gripping jaws radially movably mounted in said slots, said jaws having inclined outer ends with cam surfaces for engaging the cam surfaces in the end walls of said slots in said segmental pressure ring, said pressure ring being exteriorly threaded and said intermediate cylinder being interiorly threaded wherein said cam surfaces will move relative to each other upon rotation of the intermediate cylinder thereby moving said jaws radially in the slots for selectively gripping a tool, said outer casing being provided with an inwardly extending peripheral flange at one end for closely surrounding the intermediate cylinder, said intermediate cylinder having a centrally located peripheral external flange engaging behind the internal flange on the outer casing, an externally threaded flange on the inner cylinder engaging an internally threaded portion on the outer casing remote from said flanges, and a compression coil spring disposed between the threaded flange on the inner cylinder and the external flange on the intermediate cylinder thereby holding the intermediate cylinder resiliently stationary in relation to the outer casing and inner cylinder, each of said jaws being provided with a recess, and an inwardly projecting cam member on each of said segmental portions of said pressure ring said cam members and recesses having complementary cam surfaces thereby causing radial movement of said jaws upon relative longitudinal movement between said jaws and segmental pressure ring.

5. A chuck comprising an outer casing, an inner cylinder adapted to be attached to a spindle of a machine, an intermediate cylinder rotatably positioned between the outer casing and inner cylinder, said inner cylinder having a plurality of radial slots, a radially movable clamp jaw mounted in each slot in said inner cylinder, said slots in the inner cylinder and said jaws having complemental cam surfaces for causing radial movement of said jaws upon relative longitudinal movement between said jaws and said inner cylinder, and means interconnecting the intermediate cylinder and said jaws for moving the jaws longitudinally in the slots upon rotation of said intermediate cylinder thereby causing positive radial movement of said jaws.

References Cited in the file of this patent

UNITED STATES PATENTS

| | | |
|---|---|---|
| 864,992 | Roberts | Sept. 3, 1907 |
| 1,095,672 | Quinlan | May 5, 1914 |
| 1,552,253 | White | Sept. 1, 1925 |
| 1,679,299 | Fegley et al. | July 31, 1928 |
| 1,875,737 | Johnson | Sept. 6, 1932 |